Nov. 15, 1949  J. A. ISAACS  2,487,927
LAWN MOWER
Filed Nov. 20, 1945  3 Sheets-Sheet 1
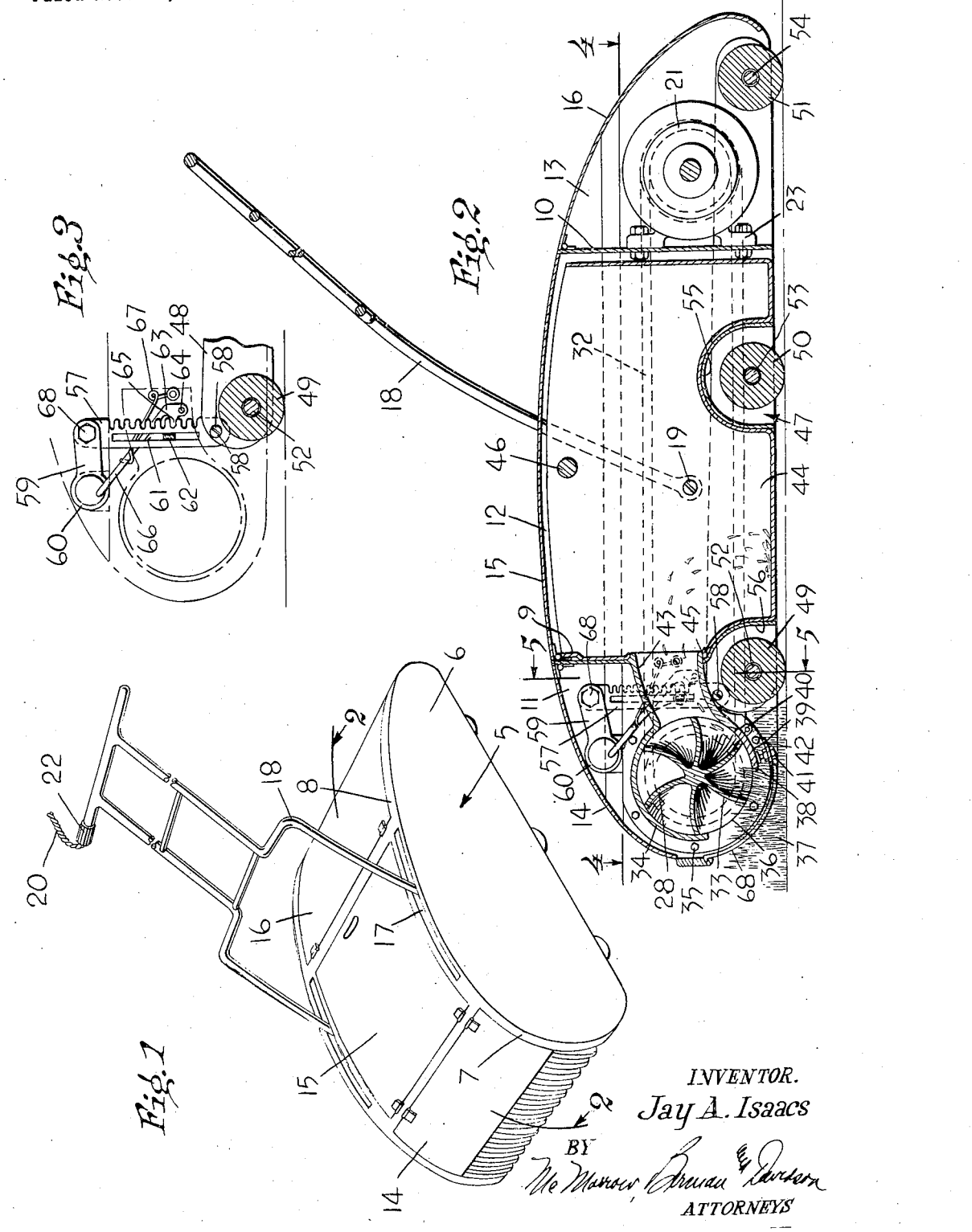
INVENTOR.
Jay A. Isaacs
BY
ATTORNEYS Nov. 15, 1949  J. A. ISAACS  2,487,927
LAWN MOWER
Filed Nov. 20, 1945  3 Sheets-Sheet 2
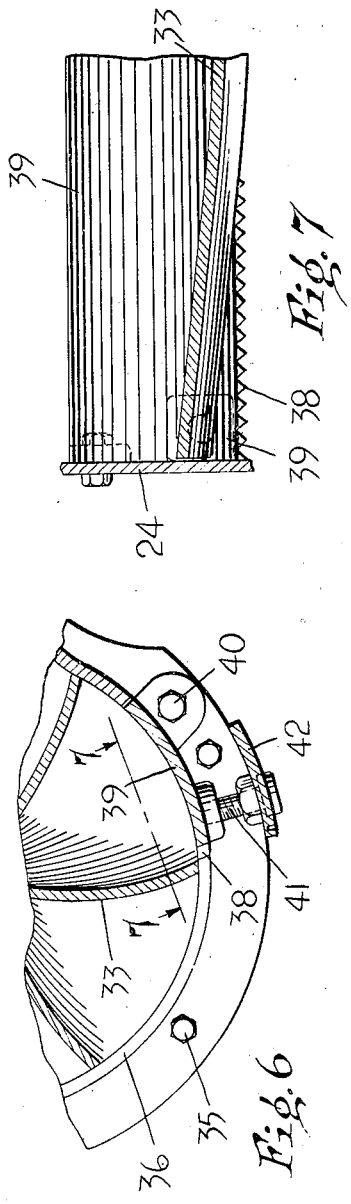
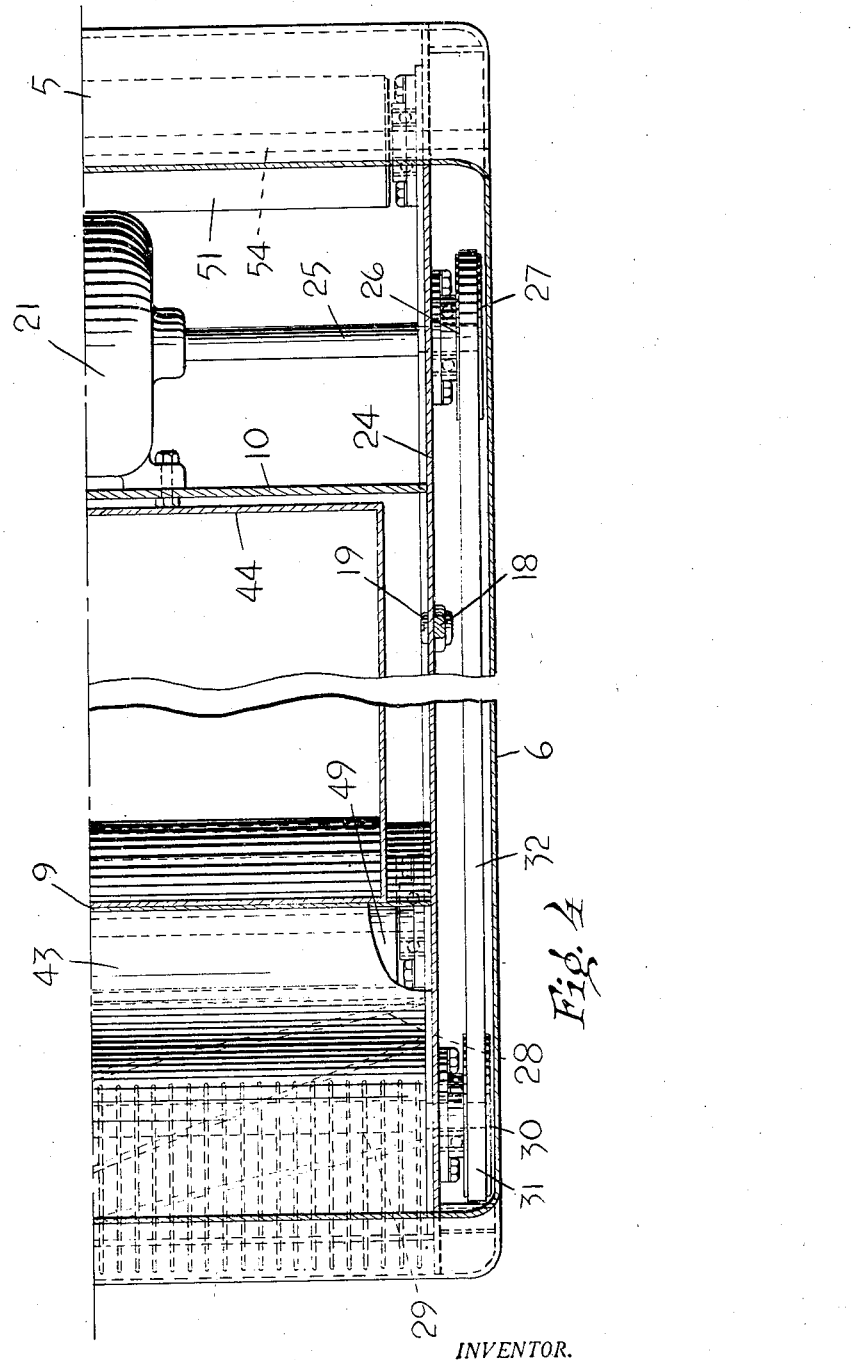
INVENTOR.
Jay A. Isaacs
BY
ATTORNEYS Nov. 15, 1949   J. A. ISAACS   2,487,927
LAWN MOWER
Filed Nov. 20, 1945   3 Sheets-Sheet 3
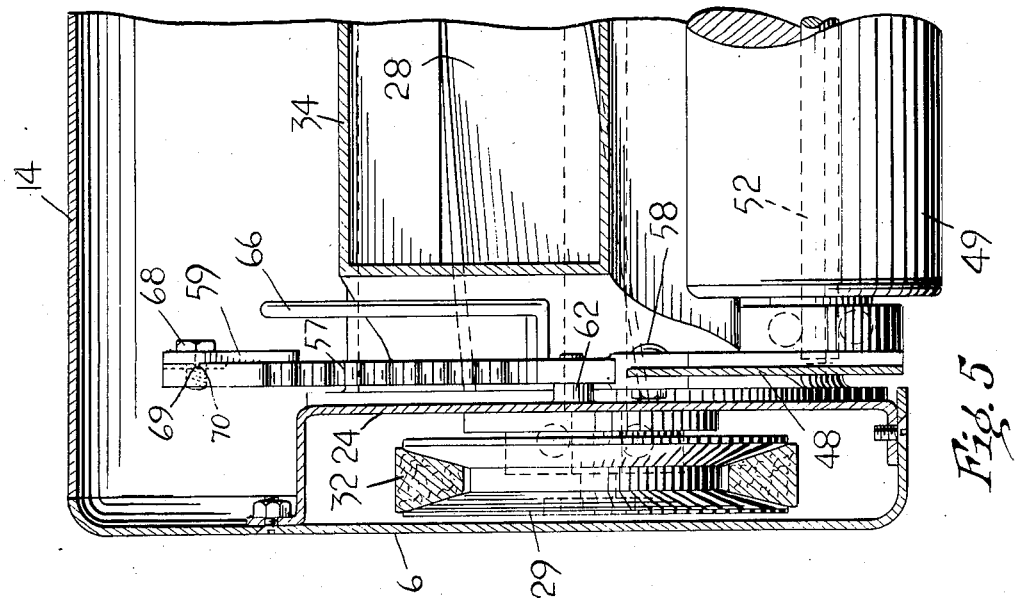
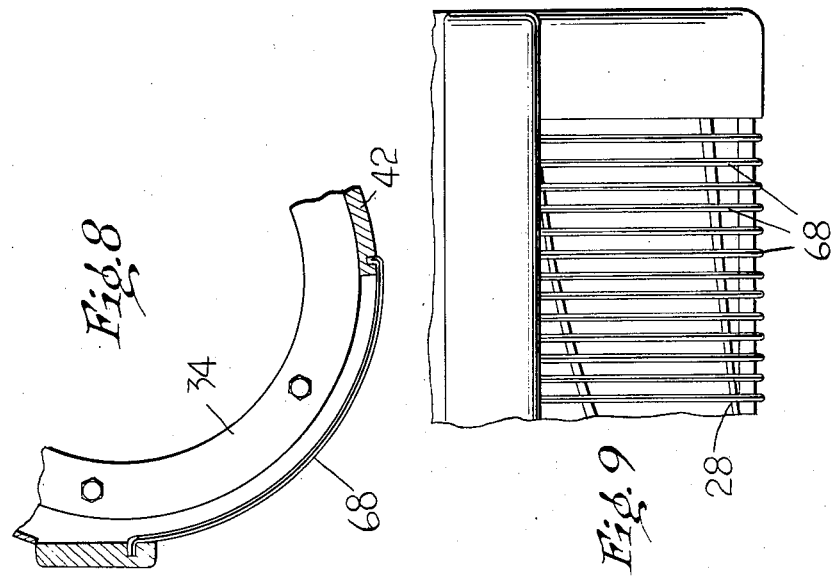
INVENTOR.
Jay A. Isaacs
BY
ATTORNEYS Patented Nov. 15, 1949

2,487,927

UNITED STATES PATENT OFFICE 2,487,927

LAWN MOWER

Jay A. Isaacs, Detroit, Mich.

Application November 20, 1945, Serial No. 629,837

3 Claims. (Cl. 56—26)

1

The present invention relates to new and useful improvements in lawn-mowers and particularly to power operated lawn-mowers wherein the power is utilized to drive a cutting reel while the lawn-mower is pushed over the ground by a person walking behind the same.

An important object of the present invention is to provide a lawn-mower of this character in which the motor and cutting mechanism are mounted in an enclosed body to protect the working parts and to improve the appearance of the device.

A further object of the invention is to provide a removable collecting pan for the grass after being cut and to construct the cutting reel in the form of a blower or impeller adapted to force the grass into the collecting pan.

A further object is to provide a carriage for the body of the lawn-mower with the cutting mechanism mounted in the front end of the body together with means for vertically adjusting the front end of the body on the carriage to regulate the cutting height of the mower.

A still further object is to provide a device of this character of simple and practical construction which is efficient and reliable in operation, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof wherein like numerals refer to like parts throughout, and in which Figure 1 is a perspective view.

Figure 2 is a longitudinal sectional view taken substantially on a line 2—2 of Figure 1.

Figure 3 is a fragmentary sectional view showing the adjusting means for the mower.

Figure 4 is a longitudinal sectional view of one side of the mower taken substantially on a line 4—4 of Figure 2.

Figure 5 is an enlarged transverse sectional view of one side of the mower taken substantially on a line 5—5 of Figure 2.

Figure 6 is an enlarged fragmentary sectional view of the adjusting means for the stationary cutter plate.

Figure 7 is a fragmentary sectional view taken substantially on a line 7—7 of Figure 6.

Figure 8 is an enlarged fragmentary sectional view of the guard at the front end of the mower, and

2

Figure 9 is a fragmentary front elevational view thereof.

Referring now to the drawings in detail wherein for the purpose of illustration I have disclosed a preferred embodiment of the invention the numeral 5 designates the body of the mower which includes the vertical side walls 6 and the forwardly rounded front end 7 and the rearwardly sloping rear end 8. The bottom of the body is open.

Front and rear transverse partitions 9 and 10 are formed in the body separating the same into a front compartment 11, a center compartment 12 and a rear compartment 13. Access to the front compartment 11 is afforded by means of a front door 14 while access to the center compartment is afforded by means of the center door 15 and access to the rear compartment is afforded by means of a rear door 16 in the top of the mower.

The central portion of the top of the body adjacent the side edges thereof, is formed with longitudinally extending slots 17 in which the lower end of an inverted U-shaped handle 18 works, the handle being pivoted to the sides 6 of the body inwardly thereof by means of pins 19. To the upper end of the handle 18 is attached an extension electric cord 20 leading through the handle to an electric motor 21 mounted in the rear compartment 13, the motor being controlled by a conventional form of switch 22 carried by the handle. The motor 21 is supported on the rear partition 10 by means of a bracket 23.

To the inside of the side walls 6 of the body is secured housings 24 extending substantially throughout the length of the sides of the body and through the ends of the shaft 25 of the motor 21 project for journalling in bearings 26 within the housing, the ends of the shaft having pulleys 27 secured thereto.

An impeller cutter 28 is mounted transversely in the front compartment 11 by means of a shaft 29 having its ends projecting into the housing 24 and journalled in bearings 30 the ends of the shaft also having pulleys 31 attached thereto to be driven from the pulleys 27 by means of belts 32, each end of the impeller cutter 28 being thus driven by the motor.

The impeller cutter 28 includes spirally formed blades 33 working in a cylindrical casing 34 supported in the front compartment 11 by means of bolts or the like 35. The front lower end of the casing 34 is open as indicated at 36 to permit the blades 33 to engage the grass designated at 37 for cutting the grass against the toothed edge 38 of a stationary cutter plate 39 positioned at the lower edge of the opening 36 of the housing 34.

The stationary cutting plate 39 is pivotally mounted adjacent its rear edge on bolts 40 secured to the flanged ends of the casing 34, while the front end of the plate is adjustable vertically by means of a screw 41 carried by a transverse bar 42. Accordingly the stationary cutter plate 39 is adjustable relative to the cutting edges of the blades 33.

The rear portion of the casing 34 is formed with a rearwardly extending tunnel 43 leading through the front partition 9 and communicating with a grass collecting pan 44 positioned in the center compartment 12 by means of an opening 45 in the front wall of the collecting pan. A rod 46 extends transversely of the collecting pan at its upper side walls to facilitate lifting of the pan from the compartment 12.

The body 5 is supported on a carriage designated generally at 47 and which includes a pair of longitudinally extending side plates 48 positioned inwardly in the sides of the housings 24, 24. A front wheel or roller 49, an intermediate roller 50 and a rear wheel or roller 51 are journalled on the side rails 48 by means of shafts 52, 53 and 54 respectively, the shaft 54 for the rear wheel or roller 51 projecting into the housings 24 at the inner sides of the body to provide a pivotal support for the rear end of the carriage, the front shaft 52 and intermediate shaft 53 being free of the body.

A transversely extending shield 55 extends between the sides of the body for covering the intermediate wheel or roller 50 and the lower portion of the front partition 9 is curved as indicated at 56 to likewise form a shield for the front wheel or roller 49. The bottom of the collecting pan 44 is shaped to conformably fit on the shields 55 and 56 for supporting the pan thereon.

The front end of the body is vertically adjustable on the carriage 47 by means of vertically extending rack bars 57 positioned at the inner side of the housings 24, the lower end of the rack bars being pivoted to the front end of the side plates 48 by means of pins 58. The upper ends of the rack bars 57 are each connected to one end of an arm 59 having a finger grip ring 60 at its other free end. The coacting ends of the rack bar and its arm are apertured and the aperture in the bar is tapped for a screw 68 also passed through the opening in the arm. The rack bar portion surrounding the aperture on the side facing the arm is provided with a pair of cruciform notches 69 engaging similar shaped ribs 70 on the confronting side of the arm so that the latter may be held in either a horizontal or vertical position when the screw is tightened. (Fig. 3.) The rack bars 57 are formed with vertically extending slots 61 in which the guide lugs 62 are freely positioned and welded or otherwise suitably secured to the sides of the housings 24.

A locking dog 63 is pivoted to the side of the housing 24 as at 64 and is formed with a detent 65 adapted for selective engagement between the teeth of the rack bar 57. The locking dog is formed with an upwardly extending lever 66 for manually releasing the dog by the hand of a person through the front door 14. A spring 67 engages the dog 63 to urge the same into locking position with the rack bar 57.

The front lower portion of the body 5 is open to permit grass to come into contact with the impeller cutter 28 and the front opening of the body is provided with a guard 68 formed of vertically extending spaced parallel wire rods.

In the operation of the device as the body 5 of the mower is pushed over the ground by the handle 18 and the electric motor 21 energized to drive the impeller cutter 28, the reel will cut the grass in the usual manner by reason of its cutting cooperation with the stationary cutter plate 39 and the blades 33 of the impeller cutter will function as a blower or impeller to force the cut grass rearwardly through the tunnel 43 into the collecting pan 44. If it is desired to return the cut grass to the lawn the collecting pan 44 is removed and the grass will then drop through the open bottom of the body.

The front end of the body may be adjusted vertically in accordance with the height of the grass being cut as well as to regulate the closeness of the cut by manipulating the lever 66 to release the dog 63 from the rack bar 57 thereby permitting the raising or lowering of the front end of the body while the rear end of the body remains pivoted on the shaft 54 for the rear wheel or roller 51.

It is believed that the details of construction, manner of use and advantages of the device will be readily understood from the foregoing without further detailed explanation.

It is to be understood, however, that even though I have herein shown and described a preferred embodiment of my invention that the same is susceptible of certain changes fully comprehended by the spirit of the invention as described herein, and the scope of the appended claims.

What I claim is:

1. A lawnmower comprising a housing having an open mouth in the bottom adjacent the forward end thereof for the reception of standing grass to be cut, wheels for supporting said housing, a pair of partitions vertically disposed in said housing and arranged in spaced relation so as to divide the housing into a front, center and rear compartment, a cylindrical casing provided with an opening in its bottom vertically disposed within said front compartment, said casing being so arranged that its opening is in registry with the open mouth of said housing and spaced from the latter, an impeller cutter mounted for rotation about a horizontal axis in said cylindrical casing, a cutter plate provided with a plurality of spaced cutting teeth arranged adjacent the lower edge of the opening in said cylindrical casing and secured to the casing, a tunnel interconnecting said cylindrical casing to said center compartment for conveying cut grass from said impeller to the center compartment, and a power unit in said rear compartment operatively connected to said impeller cutter for rotating the latter.

2. A lawnmower comprising a housing having an open mouth in the bottom adjacent the forward end thereof for the reception therein of standing grass to be cut, wheels for supporting said housing, a pair of partitions vertically disposed in said housing and arranged in spaced relation so as to divide the housing into a front, center and rear compartment, a cylindrical casing provided with an opening in its bottom vertically disposed within said front compartment, said casing being so arranged that its opening is in registry with the open mouth of said housing and spaced from the latter, an impeller cutter mounted for rotation about a horizontal axis in said cylindrical casing, a cutter plate provided with a plurality of spaced cutting teeth arranged adjacent the lower edge of the opening in said cylindrical casing and secured to the casing, a tunnel interconnecting said cylindrical casing to said center compartment for conveying cut grass from said impeller cutter to the center compartment, a power unit in said rear compartment operatively connected to said impeller cutter for rotating the latter, and a guard rail mounted across the open mouth of said housing for protecting said rotatable impeller cutter.

3. A lawnmower comprising a housing having an open mouth in the bottom adjacent the forward end thereof for the reception therein of standing grass to be cut, wheels for supporting said housing, a pair of partitions vertically disposed in said housing and arranged in spaced relation so as to divide the housing into front, center and rear compartments, a cylindrical casing provided with an opening in its bottom vertically disposed within said front compartment, said casing being so arranged that its opening is in registry with the open mouth of said housing and spaced from the latter, an impeller cutter mounted for rotation about a horizontal axis in said cylindrical casing, a cutter plate provided with a plurality of spaced cutting teeth arranged adjacent the lower edge of the opening in said cylindrical casing and secured to the casing, a tunnel interconnecting said cylindrical casing to said center compartment for conveying cut grass from said impeller to the center compartment, a power unit in said rear compartment operatively connected to said impeller cutter for rotating the latter, a guard rail mounted across the open mouth of said housing for protection of said rotatable impeller cutter, and means for adjusting the housing relative to the height of the grass.

JAY A. ISAACS.

REFERENCES CITED

The following references are of record in the file of this patent:

UNITED STATES PATENTS

| Number | Name | Date |
|---|---|---|
| 1,669,471 | Jones | May 15, 1928 |
| 1,880,154 | Rotondo et al. | Sept. 27, 1932 |
| 1,899,181 | Carolus | Feb. 28, 1933 |
| 2,303,055 | Lardi | Nov. 24, 1942 |